(12) United States Patent
Maker

(10) Patent No.: US 8,083,204 B2
(45) Date of Patent: Dec. 27, 2011

(54) FUEL SYSTEM AND ECOLOGY VALVE FOR USE THEREIN

(75) Inventor: Paul Manwaring Maker, Wrentham, MA (US)

(73) Assignee: Goodrich Control Systems Limited (GB)

( * ) Notice: Subject to any disclaimer, the term of this patent is extended or adjusted under 35 U.S.C. 154(b) by 909 days.

(21) Appl. No.: 11/934,853

(22) Filed: Nov. 5, 2007

(65) Prior Publication Data

US 2008/0115481 A1   May 22, 2008

(30) Foreign Application Priority Data

Nov. 16, 2006   (GB) .................................. 0622833.2

(51) Int. Cl.
*F16K 31/12* (2006.01)
(52) U.S. Cl. .......................................... 251/28; 251/62
(58) Field of Classification Search ............ 251/25, 251/28, 29, 62
See application file for complete search history.

(56) References Cited

U.S. PATENT DOCUMENTS

| | | | | |
|---|---|---|---|---|
| 2,998,020 A * | 8/1961 | Charasse | ...................... | 137/102 |
| 3,841,089 A | 10/1974 | Clark | | |
| 6,195,978 B1 | 3/2001 | Futa, Jr. | | |
| 6,314,998 B1 | 11/2001 | Futa, Jr. et al. | | |
| 6,412,271 B1 * | 7/2002 | Maker et al. | ................. | 60/39.08 |
| 6,751,939 B2 | 6/2004 | Futa, Jr. et al. | | |
| 2002/0184884 A1 | 12/2002 | McCarty | | |

OTHER PUBLICATIONS

European Search Report dated Jul. 2, 2009.

* cited by examiner

*Primary Examiner* — John Fristoe, Jr.
(74) *Attorney, Agent, or Firm* — Andrus, Sceales, Starke & Sawall, LLP

(57) ABSTRACT

A fuel system comprises a pressure raising valve operable to control communication between a fuel delivery line and an engine manifold line, and an ecology valve comprising a piston movable within a bore, the piston and bore together defining a control chamber and an ecology chamber, the ecology chamber communicating with the engine manifold line, the pressure within the control chamber being controllable to control the position occupied by the piston, the ecology valve further comprising seal means whereby, when the piston occupies a first position in which it engages the seal means, only a first, relatively small, effective area of the piston is exposed to a fuel pressure within the engine manifold line, a second, larger, effective area being exposed to the fuel pressure within the engine manifold line when the piston occupies a position in which it does not engage the seal. An ecology valve for use in the fuel system is also described.

9 Claims, 2 Drawing Sheets

FUEL SYSTEM AND ECOLOGY VALVE FOR USE THEREIN

BACKGROUND OF THE INVENTION

This invention relates to a fuel system, and in particular to a fuel system intended for use in aerospace applications and of the type including an ecology function. It also relates to an ecology valve to provide the ecology function.

It is desirable to provide fuel systems with an ecology function so that, upon or after engine shutdown, a quantity of fuel can be removed from the engine fuel manifolds. Such removal is advantageous in that fuel evaporation into the atmosphere is reduced and coking of the engine fuel nozzles is also reduced. There are thus environmental and engine performance and reliability benefits to the provision of an ecology function.

One known ecology function is provided by using a dump valve, operable when the engine is shut down, to allow fuel to flow from the manifold to a drains tank, and using a pump to return the fuel from the drains tank back to a fuel reservoir or to the input to the fuel system during a subsequent operation. This solution is relatively complex and costly. One such fuel ecology/reclaiming system is described in U.S. Pat. No. 3,841,089.

Ecology functions are also provided by using an ecology valve or piston to draw off a quantity of fuel from the engine manifold on or after engine shutdown, and to return the fuel to the engine manifold during subsequent operation of the fuel system. U.S. Pat. Nos. 6,195,978, 6,751,939 and 6,314,998 all describe such ecology valves or pistons. To permit control over the ecology valves or pistons, relatively complex control arrangements are often required, leading to the use of additional components and this is undesirable. Further, dynamic or sliding seals are used in many of the arrangements and it is preferred to avoid the use of such components.

SUMMARY OF THE INVENTION

According to one aspect of the invention there is provided a fuel system comprising a pressure raising valve operable to control communication between a fuel delivery line and an engine manifold line, and an ecology valve comprising a piston movable within a bore, the piston and bore together defining a control chamber and an ecology chamber, the ecology chamber communicating with the engine manifold line, the pressure within the control chamber being controllable to control the position occupied by the piston, the ecology valve further comprising seal means whereby, when the piston occupies a first position in which it engages the seal means, only a first, relatively small, effective area of the piston is exposed to a fuel pressure within the engine manifold line, a second, larger, effective area being exposed to the fuel pressure within the engine manifold line when the piston occupies a position in which it does not engage the seal.

The pressure in the control chamber is conveniently controlled by valve means, preferably defined by a porting arrangement provided in the pressure raising valve.

Such an arrangement is advantageous in that the control arrangement for the ecology valve is relatively simple, and the provision of the seal means results in the force acting on the piston due to the fuel pressure within the engine manifold line being relatively low.

Preferably, the ecology valve includes a resilient biasing means, conveniently in the form of a spring, biasing the piston towards a second position in which the ecology chamber is of relatively large volume, and the control chamber is of relatively small volume. The volume of the ecology chamber, in this condition, is chosen to accommodate the volume of fuel from the burner manifold.

A restricted flow path is preferably provided between the ecology chamber and a low pressure line. Conveniently, a valve arrangement seals the restricted flow path when the piston occupies its second position. The valve arrangement conveniently comprises a seal member carried by the piston.

Such an arrangement is advantageous in that, when the piston occupies its first position, the ecology chamber is at relatively low pressure thus the force urging the piston away from this position applied by the pressure of the fuel in the ecology chamber is low. When the piston occupies its second position, escape of fuel through the restricted flow path is avoided by virtue of the sealing action of the valve arrangement.

The invention also relates to an ecology valve adapted for use in such a fuel system.

According to another aspect of the invention there is provided an ecology valve comprising a piston movable within a bore, the piston and bore together defining a control chamber and an ecology chamber, and a restricted low pressure flow path communicating with the ecology chamber.

Preferably, a valve arrangement is provided to permit sealing of the restricted flow path.

BRIEF DESCRIPTION OF THE DRAWINGS

The invention will further be described, by way of example, with reference to the accompanying drawings, in which.

DETAILED DESCRIPTION OF THE INVENTION

Figure 1:
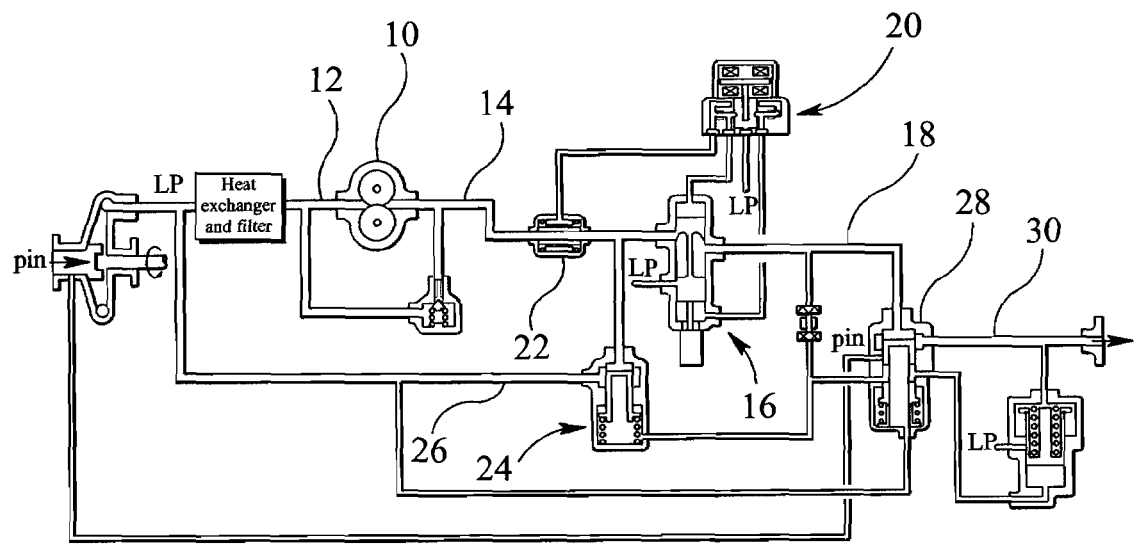
FIG. 1 is a diagram illustrating a fuel system in accordance with one embodiment of the invention.

The fuel system illustrated diagrammatically in the accompanying drawings comprises a high pressure gear pump 10 arranged to pump fuel from an inlet line 12 in which the fuel is at relatively low pressure to a supply line 14. A metering valve 16 receives fuel from the supply line 14 and controls the delivery of fuel from the supply line 14 to a delivery line 18. The metering valve 16 is controlled by a servo arrangement 20 which is supplied with fuel under pressure from the supply line 14 via a flow washed filter 22. The operation of the metering valve 16 is conventional and will not be described in further detail.

A spill valve 24 is provided and is operable to maintain a substantially constant pressure drop across the metering valve 16. In the event that the pressure drop across the metering valve 16 exceeds a pre-determined level, then the spill valve 24 will open to allow fuel to be diverted from the supply line 14 to a spill line 26.

A pressurising valve in the form of a pressure raising and shut-off valve (PRSOV) 28 is provided to which fuel is supplied through the delivery line 18. The PRSOV 28 is operable to control the supply of fuel from the delivery line 18 to an engine manifold line 30 whereby fuel is delivered to the engine manifolds.

Figure 2:
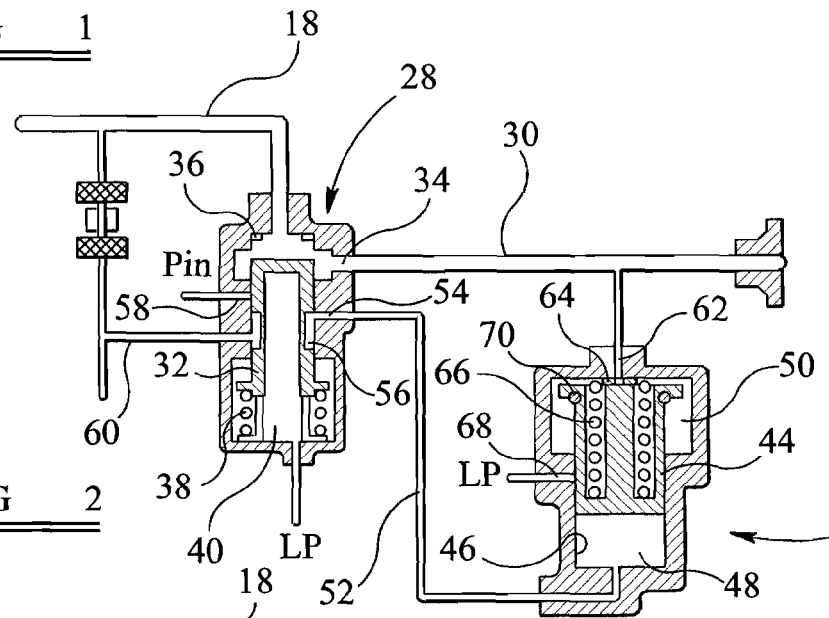
FIGS. 2 to 4 illustrate part of the system of FIG. 1 in different operating conditions.
Figure 3:
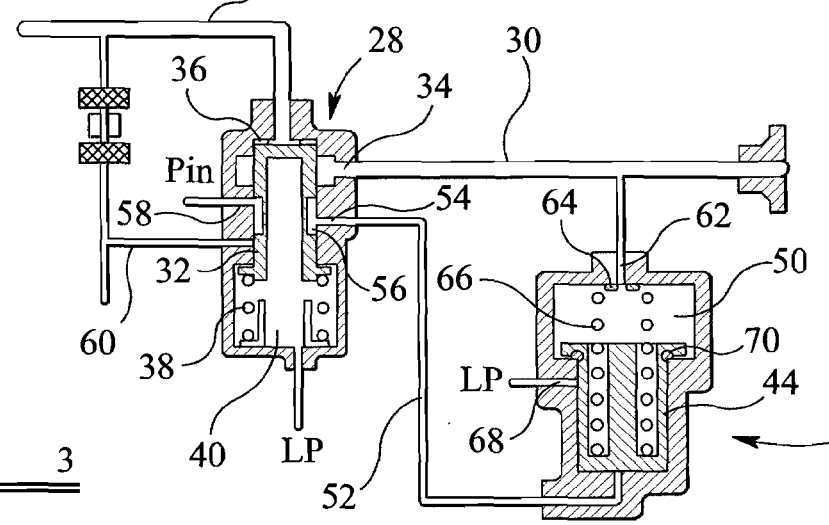

As best illustrated in FIGS. 2 and 3, the PRSOV 28 comprises a spool 32 slidable within a bore, one end of the spool 32 being engageable with a seal 36, the PRSOV 28 being arranged such when the spool 32 engages the seal 36, fuel is unable to flow from the delivery line 18 to the manifold line 30. Movement of the spool 32 away from the seal 36 permits communication between the delivery line 18 and the manifold line 30. A spring 38 acts against the spool 32, urging the spool 32 into engagement with the seal 36, the spring 38 being located within a chamber 40 which is connected to low pressure. Consequently, it will be appreciated that the PRSOV 28 occupies its closed position when the fuel pressure within the delivery line 18 is relatively low, the spool 32 moving away from the seating 36 when the pressure in the delivery line 18 rises above a pre-determined threshold to commence fuel delivery to the manifold line 30 and thus to the manifold of the engine.

The fuel system further comprises an ecology valve 42 which comprises a piston 44 slidable within a bore 46. The piston 44 and bore 46 together define a control chamber 48 and an ecology chamber 50. The control chamber 48 communicates through a control line 52 with a port provided on the PRSOV 28. The port 54 is in constant communication with an annular chamber 56 defined between the spool 32 of the PRSOV 28 and the associated bore throughout the range of movement of the spool 32. The chamber 56 is located on the spool 32 such that when the PRSOV 28 occupies a closed position as illustrated in FIG. 3, the control line 52 communicates with a low pressure port 58 provided on the PRSOV 28. Movement of the spool 32 away from this position results in communication between the control line 52 and the low pressure port 58 being broken or shut-off, and instead in the control line 52 communicating with a line 60 connected to the delivery line 18, as illustrated in FIG. 2. It will thus be appreciated that when the PRSOV 28 occupies an open position as illustrated in FIG. 2, the control chamber 48 of the ecology valve 42 will be at relatively high pressure, and that when the PRSOV 28 occupies a closed position as illustrated in FIG. 3, the control chamber 48 of the ecology valve 42 will be at low pressure. The low pressure port 58 of the PRSOV 28 is connected to the input pressure to the fuel system, i.e. the input fuel pressure to a boost pump used to supply fuel to the high pressure pump 10.

The ecology chamber 50 of the ecology valve 42 is connected through an ecology port 62 to the manifold line 30. Surrounding the ecology port 62 is located a seal member 64 engageable by part of the piston 44 such that when the piston 44 occupies a first position as illustrated in FIG. 2 in which it engages the seal member 64, only a relatively small surface area of the piston 44 is exposed to the fuel pressure within the manifold line 30. When the piston 44 moves to a position in which it no longer engages the seal member 64, then it will be appreciated that the manifold line pressure will be applied to a larger effective area of the piston 44. A spring 66 is located within the ecology chamber 50 and is arranged to apply a biasing load to the piston 44 urging the piston 44 away from the first position illustrated in FIG. 2 towards a second position as illustrated in FIG. 3. In the second position of the piston, the piston 44 is out of engagement with the seal member 64 thus a relatively large cross-sectional area of the piston 44 is exposed to the manifold line pressure, as mentioned above. In this position, the ecology chamber 50 is of increased volume or capacity, the control chamber 48 being of low volume. The capacity of the ecology chamber 50 in this mode of operation is chosen to accommodate the volume of fuel from the manifold line 30.

As illustrated, the ecology valve 42 is provided with a port 68 which, in use, is connected to the inlet side of the pump 10 and so is at low pressure, but held at a higher pressure than the fuel pressure to which the port 58 is connected. The port 68 communicates through a controlled clearance between the piston 44 and the bore 46 with the ecology chamber 50, the fit of the piston 44 and bore 46 being such that a substantially fluid-tight seal is formed between the port 68 and the control chamber 48. The controlled clearance defines a restricted fluid flow path between the ecology chamber 50 and the port 68.

A seal ring 70 is provided on the piston 44 and is engageable with part of the wall of the bore 46 to form a seal between the piston 44 and the wall of the bore 46 when the piston 44 occupies its second position, the seal ring 70 acting in conjunction with the valve arrangement operable to close the restricted fluid flow path.

In use, when fuel is being delivered to the engine manifold as illustrated in FIG. 2, then the PRSOV 28 is open. The position of the PRSOV 28 is such that the control chamber 48 of the ecology valve 42 is held at high pressure. The pressure within the control chamber 48 is sufficient to overcome the action of the spring 66 thus the piston 44 is held in its first position. In this position, the piston 44 engages the seal 64 thus manifold line pressure is applied only to a relatively small area of the piston 44, allowing the piston to remain in its first position at intermediate metered flow conditions when there is minimal difference between the pressure in the control chamber 48 and the manifold line 30. It will be appreciated that this configuration permits the use of a higher load in the spring 66 than if the seal 64 were not present, offering higher forces at shutdown to overcome restraining forces acting on piston 44. The ecology chamber 50 communicates via the restricted flow path with the port 68, thus the ecology chamber 50 is held at relatively low pressure.

Upon shutting down the engine, the PRSOV 28 will be moved to its closed position as illustrated in FIG. 3. In this position, the supply of fuel from the line 18 to the manifold line 30 is terminated. Further, the movement of the PRSOV 28 results in communication between the control chamber 48 and the line 18 being broken, and instead in communication being established between the control chamber 48 and the port 58. The fuel pressure within the control chamber 48 thus falls rapidly. The reduction in fuel pressure within the control chamber 48 is sufficient that the piston 44 is able to move under the action of the spring 66 and the fuel at manifold line pressure applied to the small area of the piston 44 exposed to this pressure during this mode of the operation of the ecology valve 42. As the movement of the piston 44 commences, it will be appreciated that fuel from the engine manifold is drawn through the port 62 into the ecology chamber 50, thus withdrawing a quantity of fuel from the engine manifolds to provide an ecology function. It will be appreciated that, from the moment the piston 44 moves from its first position, manifold line pressure is applied to a significantly larger area of the piston 44 than when the piston 44 occupies its first position, thus assisting in moving the piston 44 from the position shown in FIG. 2 towards its second position as illustrated in FIG. 3.

Once the piston 44 has reached the position illustrated in FIG. 3 under the action of the spring 68 and manifold line pressure, it will be appreciated that the ecology function will have been achieved by the drawing off of fuel from the engine manifolds. Further, the seal ring 70 will have moved into sealing engagement with the bore 46 thus breaking the restricted flow path between the ecology chamber 50 and the port 68. Consequently, the fuel drawn from the engine manifolds will not be returned to the low pressure side of the pump 10. Rather, the fuel will be held within the ecology chamber 50 until such time as it is desired to re-start the engine.

Figure 4:
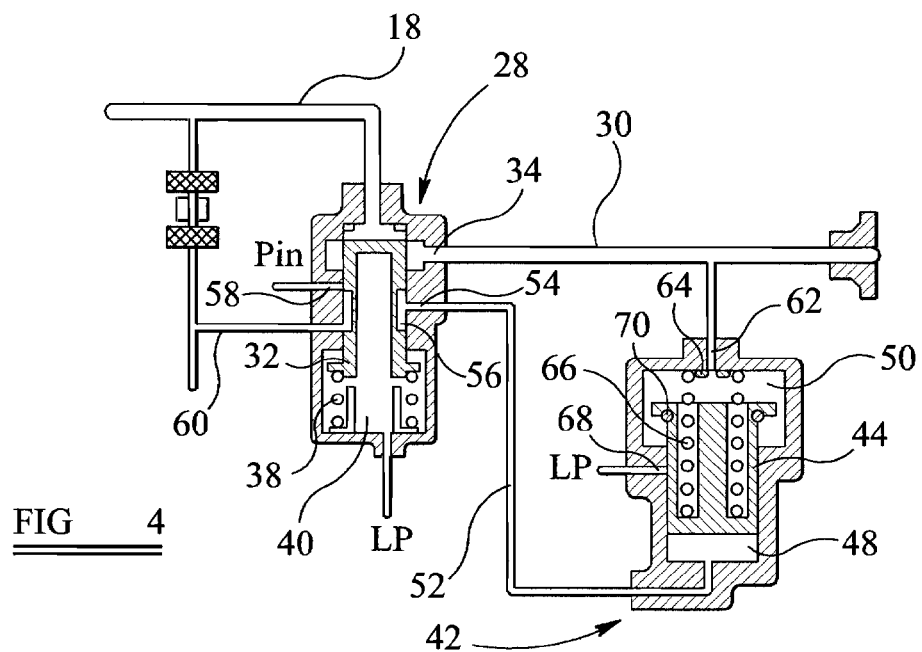
Figure 5:
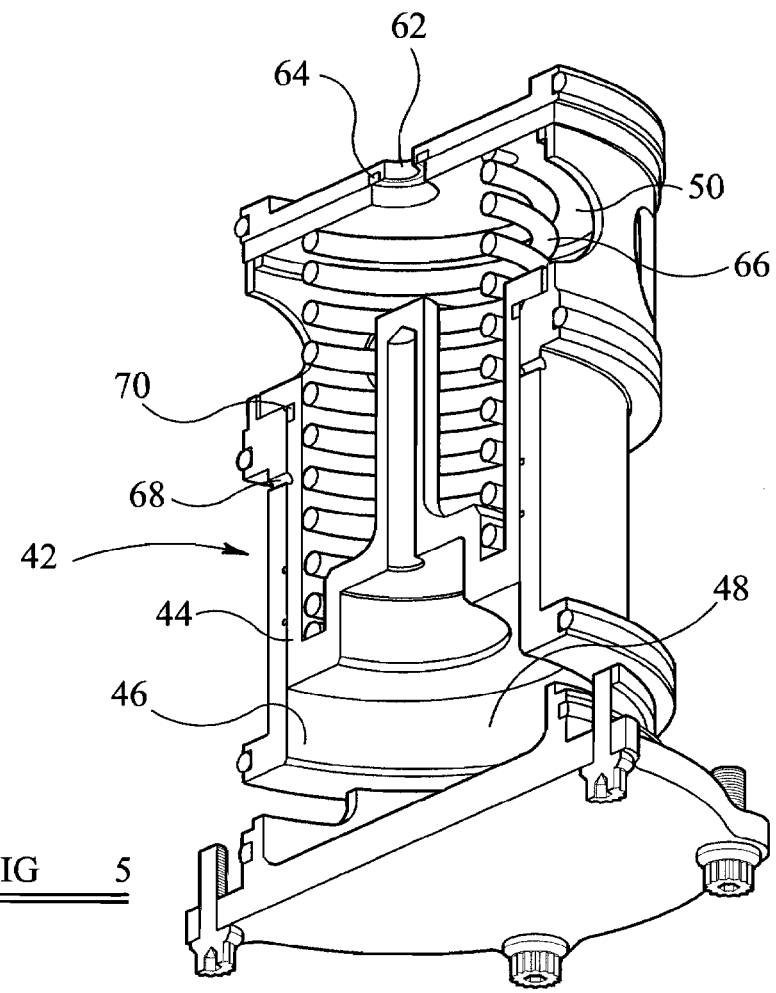
FIG. 5 is a perspective, sectional view illustrating the ecology valve of the embodiment of FIGS. 1 to 4.

When it is desired to re-start the engine, the line 18 will be re-pressurised. Once the pressure within the line 18 reaches a level sufficient to open the PRSOV 28, it will be appreciated that the movement of the spool 32 will break the communication between the control chamber 48 and the low pressure port 50, and instead communication will be established between the control chamber 48 and the line 18. Consequently, the control chamber 48 will be pressurised to a high level. The PRSOV spool and bore arrangement is configured such that during this transition phase at start-up when communication to the control chamber 48 changes from low pressure to a higher pressure level, the flow path from the line 18 to the manifold line 30 is closed off as illustrated in FIG. 4. Hence, during this transition phase, all of the flow from the metering valve 16 is used to displace the ecology valve piston 44 towards its first position, and the flow delivered to the manifold line 30 from the ecology chamber 50 via ecology port 62 is substantially equal to the flow delivered from the metering valve 16 to line 18. This provides a means of controlling the purge rate from the ecology chamber 50. When the piston 44 reaches its first position, flow into the control chamber 48 is terminated, fuel pressure in the line 18 rises and the PRSOV spool 32 continues to move in a downwards direction, as shown in FIG. 4, allowing communication between the line 18 and the manifold line 30 via the main PRSOV outlet port 34. It will be appreciated that once the ecology valve piston 44 has reached its first position, the port 62 is closed, thus as the fuel pressure within the manifold line 30 rises, the increased fuel pressure within the manifold line 30 acts only upon a relatively small surface area of the piston 44 and is insufficient to cause movement of the piston 44 away from its first position.

The movement of the piston 44 away from its second position results in the seal ring 70 moving out of engagement with the wall of the bore 46, thus the restricted flow path is re-opened and, once the piston 44 has reached its first position, the fuel pressure within the ecology chamber 50 will fall as fuel is able to escape therefrom through the restricted flow path to the port 68.

It will be appreciated that the fuel system described hereinbefore is advantageous in that an ecology function is provided in which control over the operation of the ecology function is achieved in a relatively simple and convenient manner. This is assisted by designing the ecology valve in such a manner that, during normal operation of the engine, the hydrostatically applied forces urging the piston 44 away from its first position are relatively low. In addition, the use of dynamic or sliding seals is avoided and this may have performance, reliability and life benefits for the ecology valve and fuel system.

It will be appreciated that a wide range of modifications and alterations may be made to the arrangement described hereinbefore without departing from the scope of the invention.

The invention claimed is:

1. An aerospace fuel system comprising a pressure raising valve operable to control the delivery of fuel from a fuel delivery line to an engine manifold line, and an ecology valve communicating via an ecology port with the engine manifold line but not restricting fuel flow along the engine manifold line, the ecology valve comprising a piston movable within a bore, the piston and bore together defining a control chamber and an ecology chamber, the volume of the ecology chamber being dependent upon the position of the piston, the ecology chamber communicating with the engine manifold line via the ecology port, the pressure within the control chamber being controllable to control the position occupied by the piston, the ecology valve further comprising seal means whereby, when the piston occupies a first position in which it engages the seal means, only a first, relatively small, effective area of the piston is exposed to a fuel pressure within the engine manifold line and the volume of the ecology chamber is relatively small, a second, larger, effective area of the piston being exposed to the fuel pressure within the engine manifold line, and the ecology chamber being of increased volume, when the piston occupies a second position in which it does not engage the seal, the movement of the piston from its first position to its second position drawing fuel from the engine manifold line into the ecology chamber through the ecology port.

2. A system according to claim 1, wherein the pressure in the control chamber is controlled by valve means.

3. A system according to claim 2, wherein the valve means is defined by a porting arrangement provided in the pressure raising valve.

4. A system according to claim 1, wherein the ecology valve includes a resilient biasing means biasing the piston towards a second position in which the ecology chamber is of relatively large volume, and the control chamber is of relatively small volume.

5. A system according to claim 4, wherein the resilient biasing means is in the form of a spring.

6. A system according to claim 1, wherein a restricted flow path is provided between the ecology chamber and a low pressure line.

7. A system according to claim 6, wherein a valve arrangement seals the restricted flow path when the piston occupies its second position.

8. A system according to claim 7, wherein the valve arrangement comprises a seal member carried by the piston.

9. An ecology valve communicating via an ecology port with the engine manifold line but not restricting fuel flow along the engine manifold line, the ecology valve comprising a piston movable within a bore, the piston and bore together defining a control chamber and an ecology chamber, the volume of the ecology chamber being dependent upon the position of the piston, the ecology chamber communicating with the engine manifold line via the ecology port, the pressure within the control chamber being controllable to control the position occupied by the piston, the ecology valve further comprising seal means whereby, when the piston occupies a first position in which it engages the seal means, only a first, relatively small, effective area of the piston is exposed to a fuel pressure within the engine manifold line and the volume of the ecology chamber is relatively small, a second, larger, effective area of the piston being exposed to the fuel pressure within the engine manifold line, and the ecology chamber being of increased volume, when the piston occupies a second position in which it does not engage the seal, the movement of the piston from its first position to its second position drawing fuel from the engine manifold line into the ecology chamber through the ecology port.

* * * * *